United States Patent Office 3,296,204
Patented Jan. 3, 1967

---

3,296,204
SULFONATED POLYAMIDES
John R. Caldwell, Kingsport, Tenn., assignor to Eastman Kodak Company, Rochester, N.Y., a corporation of New Jersey
No Drawing. Filed Feb. 20, 1962, Ser. No. 174,392
6 Claims. (Cl. 260—49)

This invention relates to novel, high molecular weight, linear polyamides. More particularly, this invention relates to polyamides containing sulfonated aromatic groups in their molecular structure.

An object of this invention is to provide a new class of resinous polyamides.

Another object of this invention is to provide novel resinous polyamides that are especially useful for preparing fibers, sheet materials, films, molded articles, and the like.

A further object of this invention is to provide novel polyamides that are readily dyeable and that have a high capacity for absorbing moisture.

An additional object of this invention is to provide novel polyamide fibers that have improved dyeing properties, high capacity for absorbing moisture, and greatly reduced tendency toward static electrification.

In accordance with this invention, the above objects are accomplished by preparing polyamides that contain sulfonated aromatic groups in their molecular structure. The polyamides of this invention are particularly useful for the production of hydrophilic fibers that possess certain highly desirable properties.

It is well known that commercially available polyamide fibers, particularly at low humidities, have the property of developing relatively strong charges of static electricity. This property is highly undesirable in that sparks can result from transfer of the charges. Furthermore, static electrification of apparel can cause discomfort to the wearer. Fibers prepared from the polyamides of this invention contain strongly ionized salt groups that are chemically attached to the polyamide. These groups reduce substantially this tendency towards static electrification, and their effect is exerted throughout the life of the fiber owing to the fact that they are an integral part of the fiber. This behavior is in contrast to the usual type of antistatic finish applied as a coating to the surface of the fibers. Antistatic surface coatings are usually removed from the fiber after repeated laundering or dry cleaning.

An important property of the new polyamide fibers of this invention is their high moisture regain. In this respect the fibers resemble cotton and wool. It is well known that for apparel use, a high capacity for moisture absorption is important for determining whether or not a fabric will feel comfortable to the wearer. The new polyamide fibers of this invention have a greater capacity for moisture absorption than the polyamide fibers now known to the art. Hence, they have the desirable comfort factors that are usually associated with wool and cotton. At the same time, however, the new fibers can be made so as to possess a tensile strength and elongation superior to that of wool and cotton. It will thus be apparent that fibers prepared from the novel polyamides of this invention, as detailed more fully hereinafter, represent a valuable contribution to the textile industry because they combine all the desirable properties that are found in both natural fibers and synthetic fibers.

The polyamides of this invention are further characterized by good affinity for commercial dyes, dyeing well with cellulose acetate dyes, premetallized dyes and some acid wool dyes.

In general, any of the known fiber-forming polyamides can be modified in accordance with this invention.

In accordance with this invention, polyamides are prepared by employing as one of the reactants therein a sulfonated aromatic dicarboxylic acid. Suitable sulfonated aromatic dicarboxylic acids include those having the structural formulas

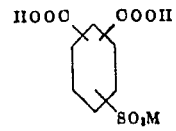

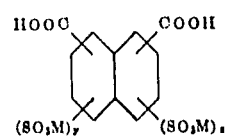

and

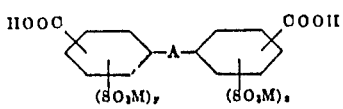

In the above structural formulas M is an alkali metal such as potassium, sodium, lithium and cesium; A represents a direct bond or a divalent radical selected from the group consisting of —O—, —CH$_2$—, —CH$_2$—CH$_2$—, —O—CH$_2$—CH$_2$—O—, —SO$_2$—, —S—, —CF$_2$—, —C(CH$_3$)$_2$—,

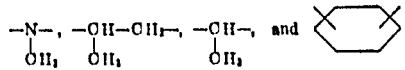

and y and z are 0 or 1, the sum of y and z being at least 1.

It will be understood that, in the above structural formulas, any or all of the hydrogens in the carboxy groups (—COOH) can be replaced with alkyl groups, usually the lower alkyl groups, and the —OH of the carboxy groups can be replaced by a halogen such as chlorine. Thus, the polyamides of this invention can be prepared by employing the lower alkyl esters and the acid chlorides of the above compounds.

The polyamides of this invention will contain in their molecular formula recurring structural units of the general structure I 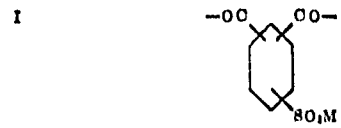

II 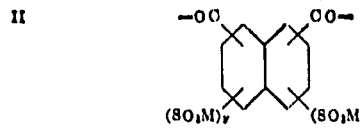

and

III 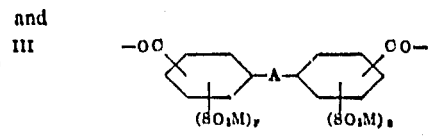

wherein M, A, y and z are as previously defined.

In carrying out this invention the sulfonated aromatic dicarboxylic acid can be employed in varying amounts. It has been determined, however, that amounts sufficient to provide a polyamide containing the above recurring structural units in amounts of from about 5 to 50 mole percent, with about 15 to 25 mole percent being preferred, can be employed. In general, the proportions of the respective recurring units in the polyamide will be found to be approximately the same as the mole proportions of the reactants.

Examples of sulfonated aromatic dicarboxylic acids that can be employed in carrying out this invention include the following

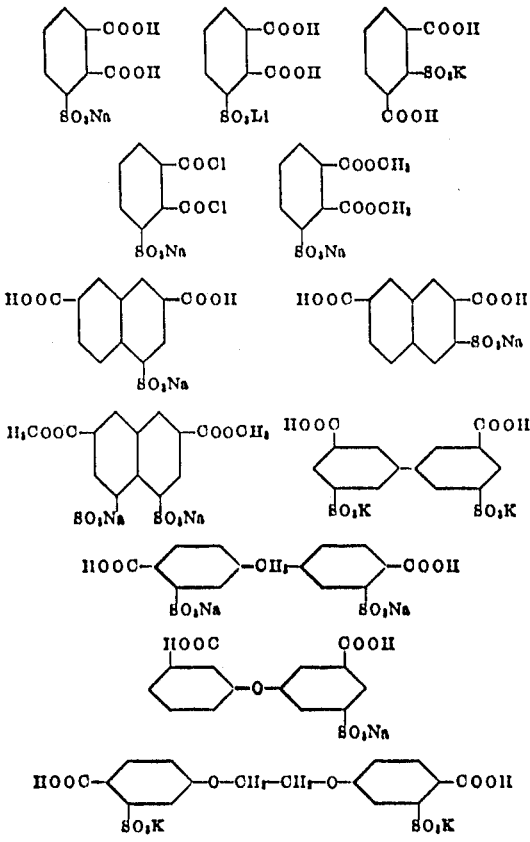

The other reactants employed in this invention are well known polyamide forming compounds and include various aminoacids having the general formula $$H_2N—R—COOH$$

wherein R is selected from the group consisting of a divalent aliphatic radical, either straight or branced chain; a divalent alicyclic radical; and a divalent aromatic radical. If aminoacids are employed in carrying out this invention, the polyamide will be comprised of, in addition to at least one of the recurring units I, II, and III, recurring units of the general structure

IV    —HN—R—CO— wherein R is as previously defined.

Also salts of various dicarboxylic acids and diamines represented by the structural formulas $$HOOC—R_1—COOH$$

and $$H_2N—R_2—NH_2$$

can be employed in the preparation of the polyamides of this invention. In the above formulas $R_1$ is selected from the group consisting of divalent aliphatic radicals, either straight or branced chain; divalent alicyclic radicals; and divalent non-sulfonated aromatic radicals. $R_2$ is selected from the group consisting of divalent aliphatic radicals, either straight or branced chain; divalent alicyclic radicals; and divalent aromatic radicals. Polyamides of this invention prepared from the above salts will be comprised of, in addition to at least one of the structural units I, II, and III, recurring units of the general structure

V    —HN—R$_2$—NH—CO—R$_1$—CO— wherein $R_1$ and $R_2$ are as above defined.

Instead of using the salt of the above defined diamines and dicarboxylic acids, the polyamides of this invention can be prepared by a condensation reaction from a mixture of a diamine, as above defined, a dicarboxylic acid, as above defined, and a sulfonated aromatic dicarboxylic acid. Thus, for example, a mixture of the above compounds can be heated in a suitable reaction vessel, in an inert atmosphere, at a temperature of from about 200° C. to 280° C. for about 2 to 4 hours, or longer depending on the viscosity desired of the resulting polyamide. The reaction can be conveniently carried out in aqueous media or in a suitable solvent such as cresol, xylenol, o-hydroxydiphenyl, and the like. It is preferred, however, to employ the salt of the diamine and dicarboxylic acid.

In the preferred method of preparing the polyamides of this invention a salt of the sulfonated aromatic dicarboxylic acid and a diamine is first prepared. Suitable diamines for this purpose include any of those set forth hereinabove for use in preparing salts of a diamine and the defined dicarboxylic acid. The salt can be conveniently produced by dissolving substantially equimolar proportions of the diamine and the sulfonated aromatic dicarboxylic acid in water and subsequently pouring the solution into a nonsolvent for the formed salt, such as ethanol, wherein the salt precipitates out.

The diamine-sulfonated aromatic dicarboxylic acid salt is then reacted with (1) an aminoacid, as above defined, or (2) a diamine-dicarboxylic acid salt, as above defined to produce the novel polyamides of this invention. Known polyamide forming methods can be employed. It is preferred, however, to prepare a mixture of the above ingredients and heat the mixture in an inert atmosphere at a temperature of from about 230° C. to 260° C. for about 1 hour to 2 hours to form a low molecular weight polymer, usually referred to in the art as a prepolymer. The reaction is carried out in aqueous media or in a solvent such as cresol, xylenol, or o-hydroxydiphenyl. The prepolymer is then heated and stirred, in its molten form, at a temperature of from about 240° C. to 300° C. for about 1 hour to 3 hours, or longer to produce a polyamide of desired viscosity. Alternatively, the prepolymer can be solidified and ground to particle size, particles of a cross-sectional diameter of about 0.03 inch or smaller being satisfactory. The particles are subsequently heated in a vacuum or in an inert atmosphere at 10° C. to 50° C. below their melting point for about 2 to 4 hours. Under these conditions, the polymer can be built up to a relatively high viscosity.

Aminoacids that can be used in carrying out this invention include straight chain aliphatic aminoacids having the structural formula $$H_2N(CH_2)_nCOOH$$

wherein $n$ represents an integer of 5 through 10, branched chain aliphatic aminoacids of the same range of carbon atoms as the straight chain aliphatic aminoacids, alicyclic aminoacids, and aromatic aminoacids.

Specific examples of aminoacids include 5-amino-n-valeric acid, 6-amino-n-caproic acid, 7-amino-n-heptanoic acid, 12-amino-n-dodecanoic acid, 3-methyl-6-aminohexanoic acid, 4,4-dimethyl-7-aminoheptanoic acid 4-ethyl-6-amino-hexanoic acid, 4-aminocyclohexanecarboxylic acid, 3-aminomethylcyclohexanecarboxylic acid, 4-aminoethylcyclohexanecarboxylic acid, 4-aminomethylcyclohexanecarboxylic acid, 4-carboxypiperidine, α-amino-p-toluic acid, α-amino-m-toluic acid, 5-aminonorcamphane-2-carboxylic acid, and 5-aminomethylnorcamphane-2-carboxylic acid.

As set forth hereinabove various salts of certain dicarboxylic acids and diamines can be employed as one of the reactants in preparing the novel polyamides of this invention.

Dicarboxylic acids suitable for this purpose include aliphatic dicarboxylic acids containing from 4 to 12 carbon atoms between the carboxyl groups, either straight or branched chains, non-sulfonated aromatic dicarboxylic acids, and alicyclic dicarboxylic acids.

Specific examples of aliphatic dicarboxylic acids include oxalic acid, dimethylmalonic acid, succinic acid, glutaric acid, adipic acid, 2-methyladipic acid, 3-ethyladipic acid, pimelic acid, azelaic acid, suberic acid, sebacic acid, 3-ethylsebacic acid, and dodecanedioic acid.

Specific examples of alicyclic dicarboxylic acids include 1,1-cyclohexanedicarboxylic acid, 1,2-cyclohexanedicarboxylic acid, 1,3-cyclohexanedicarboxylic acid, and 1,4-cyclohexanedicarboxylic acid. The trans isomer of the above acids is preferred; however, the cis isomer or mixtures of the two can be employed if desired. Other suitable alicyclic dicarboxylic acids include norcamphane-2,5-dicarboxylic acid; norcamphane-2,6-dicarboxylic acid, and

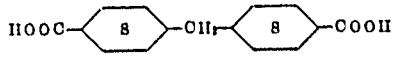

Non-sulfonated aromatic dicarboxylic acids include phthalic acid, isophthalic acid, terephthalic acid, and the halogenated derivatives of these acids. Other suitable aromatic dicarboxylic acids include those acids having the structural formula

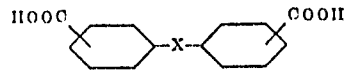

wherein X can be, for example, a direct bond, —O—, —S—, —SO$_2$—, —CH$_2$—, —CH$_2$—CH$_2$—, —CH$_2$—CH$_2$—CH$_2$—, —CH$_2$—CH$_2$—CH$_2$—CH$_2$—CH$_2$—, —O—C$_2$H$_4$—O—, —C(CH$_3$)$_2$—, —O—⟨ ⟩—O—, —CH$_2$—⟨ ⟩—CH$_2$—, and —CH— | —N—

Acids containing one or more ether groups in the molecular chain as represented by ethylenedioxydiacetic acid, 4,4'-oxydibutyric acid, and 3,3'-oxydipropionic acid can be employed.

Suitable diamines for use in preparing the above-mentioned salt include aliphatic diamines containing 4 to 12 carbon atoms between the amino groups, either straight or branched chains, alicyclic diamines, and amines containing one or more aromatic nuclei.

Specific examples of aliphatic diamines include ethylene diamine, tetramethylenediamine, pentamethylenediamine, hexamethylenediamine, octamethylenediamine, 1,12-diaminododecane, 2,2-dimethyl-1,5-diaminopentane, 3,6-diethyl-1,8-diaminooctane, 2-methyl-1,3-diaminopropane, 3-ethyl-1,6-diaminohexane, and 4-butyl-1,10-decamethylenediamine. Diamines containing one or both amino groups on a secondary carbon atom and diamines containing secondary amino groups can also be employed.

Examples of specific alicyclic diamines include 1,2-diaminocyclohexane, 1,3-diaminocyclohexane, 1,4-diaminocyclohexane, 1,1 - cyclohexanebis(methylamine), 1,2 - cyclohexanebis(methylamine), 1,3 - cyclohexanebis(methylamine), and 1,4 - cyclohexanebis(methylamine). These diamines can be used as the transisomer or as a mixture of cis- and trans-isomers. Other suitable alicyclic diamines include 2,5 - norcamphanediamine, 2,6 - norcamphanediamine, 2,5 - norcamphanebis(methylamine), and 2,6-norcamphanebis(methylamine).

Diamines containing one or more aromatic nuclei include o-, m-, and p-xylene-α,α'-diamines, and 3,4'-di(aminomethyl)diphenyl.

Diamines containing ether groups such, for example, as 3,3' - oxybis(propylamine), 3,3' - (ethylenedioxy)bis(propylamine), and 3,3'-(2,2-dimethyltrimethylenedioxy)bis(propylamine) can be employed in carrying out this invention.

It is understood that the polyamides of this invention can be prepared by employing, in place of the above-defined acidic compounds, the lower alkyl esters thereof. The phenyl ester can also be employed if desired. Further, the acid chloride of the acidic compound can be employed in preparing polyamides of this invention if desired. This is usually accomplished in the presence of an acid-accepting agent.

In some instances it can be desirable to heat the sulfonated aromatic dicarboxylic acid with an excess of a diamine, usually about 25 mole percent to 45 mole percent, to provide diamine that is terminated with amino groups. The dicarboxylic acid is then added in an amount molecularly equivalent to the excess diamine employed and the reaction is completed as above described.

Novel polyamides of this invention have a high molecular weight and are capable of forming strong, elastic fibers. The polymers have an intrinsic viscosity of at least about 0.4. The intrinsic viscosity is defined as $$\frac{\log_e N_r}{C}$$

in which $N_r$ is the viscosity of a dilute solution of a polymer in m-cresol divided by the viscosity of m-cresol in the same units and at the same temperature, and $C$ is the concentration in grams of polymer per 100 cc. of solution. Measurement of the intrinsic viscosity is usually the most convenient method for following the course of the polyamide forming reaction. In most cases, it is usually desirable to continue the reaction until the viscosity is above about 0.4, and preferably above 0.6. The polymers thus obtained have excellent fiber-forming properties and cold drawing properties in addition to high melting points, high tensile strength, excellent elongation and elastic recovery properties. The polymers of this invention are crystalline, linear polymers that can be formed into fibers that are oriented along their axis. Polyamides prepared in accordance with this invention have melting points within the range of about 200° C. to 300° C.

The fibers can be prepared from the polyamides of this invention by conventional melt spinning processes well known in the art. Also, the polyamides can be dissolved in a suitable solvent and extruded into a precipitating bath, or they can be dry spun from a volatile solvent, such as formic acid, to provide satisfactory fibrous members. Furthermore, films can be prepared from the polyamides of this invention by well-known film forming methods such, for example, as by extrusion. Molded members can also be prepared from the polyamides by known molding methods such as by injection molding and the like.

The following examples are illustrative of this invention.

*Example 1*

About 284 grams (1.0 mole) of the potassium salt of 5-sulfoisophthalic acid and about 121 grams (1.05 moles) of hexamethylenediamine are dissolved in about 700 cc. of water and the resulting solution is poured into about 5000 cc. of ethyl alcohol. The salt of the potassium salt of 5-sulfoisophthalic acid and hexamethylenediamine is separated out as white crystals. About 60 grams (0.15 mole) of the above salt and about 222 grams (0.85 mole) of adipic acid-hexamethylenediamine salt are placed in an autoclave together with 20 cc. of water. The autoclave is closed and the contents are stirred in an atmosphere of nitrogen at a temperature of about 240° C. to 250° C. for about 1 hour. Steam is then released and stirring is continued until substantially all the water present in the reaction product is removed. This phase of the operation requires about 1 hour. The molten prepolymer thus prepared is extruded from the autoclave in the form of a rod having a cross-sectional diameter of about ⅛ inch. The rod is cut into ¼ inch lengths. A plurality of these prepared members are heated and stirred at a temperature of about 250° C. for about 1 hour in a nitrogen atmosphere and then in a vacuum of 0.1 mm. for about 1 hour. The polyamide thus produced has an intrinsic viscosity of 0.80, and a melting point range of 225° C. to 240° C. Fibers are prepared from the melt by conventional melt spinning processes. The fibers thus prepared have a tensile strength of 4.2 grams per denier and an elongation of about 18%.

The fibers have a moisture regain of 7.0%. The fibers show a substantially reduced tendency toward static electrification and the fibers dyed heavily with basic dyes.

*Example II*

About 100 grams (0.25 mole) of the salt of potassium 5-sulfoisophthalic acid and hexamethylenediamine prepared in accordance with Example I is mixed with 280 grams (0.75 mole) of the salt derived from hexamethylenediamine and 4,4'-methylenedibenzoic acid. The mixture is placed in an autoclave, similar to that employed in Example I, and 50 cc. of water is added. The autoclave is flushed with nitrogen, closed, and the contents stirred at a temperature of 240° C. to 250° C. for one hour. Steam is then blown off until an internal pressure of 100 p.s.i. is obtained. This operation requires about one hour. The prepolymer thus produced is removed from the autoclave and granulated to a particle size of about 0.003 inch. The granulated prepolymer is then heated in a vacuum of about 0.1 mm. for about 2 hours at a temperature that varies, during this two hour period, from between 240° C. and 250° C. The resulting product has an intrinsic viscosity of about 0.72 as measured in a mixture of 60 parts by weight of phenol and 40 parts by weight of tetrachloroethane. The polymer has a melting point range of from about 260° C. to 275° C. Fibers prepared from this polyamide have a moisture regain of about 6.8%.

*Example III*

About 0.35 mole of the salt of sodium 5-sulfoisophthalic acid and 1,4-cyclohexanebis(methylamine) is mixed with about 0.65 mole of the salt made from adipic acid and 1,4-cyclohexanebis(methylamine), and a polymer prepared therefrom in accordance with the procedure of Example II. The polyamide has a melting point range of from about 240° C. to 250° C. Fibers prepared from the polymer by melt spinning have a moisture regain of 8.3% and show a reduced tendency toward static electrification.

*Example IV*

Diphenyl terephthalate (0.70 mole), 0.30 mole of the diphenyl ester of the lithium salt of sulfoterephthalic acid, and 1.0 mole of 3,3'-oxybis(propylamine) are placed in a vessel equipped with a stirrer. The mixture is stirred in a nitrogen atmosphere at 200° C. for three hours. The temperature is then raised to 270° C. and the phenol, one of the products of the condensation reaction, is allowed to distill off. The melt is then stirred for about 1 hour at this temperature of 270° C. a vacuum of 0.1 mm. The polymer thus produced has an intrinsic viscosity of 0.63 and a melting point range of 235° C. to 250° C. Fibers prepared from this polyamide have a moisture regain of 8.2%.

*Example V*

By substantially the same method as that set forth in Example IV, a polyamide is made from 0.80 mole of 4-aminomethylbenzoic acid, 0.20 mole of tetramethylenediamine and 0.20 mole of

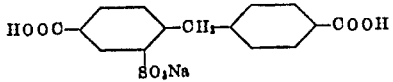

Fibers made from the polymer have a moisture regain of 7.1%, and soften at a temperature within the range of 230° C. to 240° C.

*Example VI*

By substantially the same method as that set forth in Example IV a polyamide is made from 1.0 mole of 1,4-cyclohexanebis(methylamine), 0.80 mole of pimelic acid and 0.20 mole of

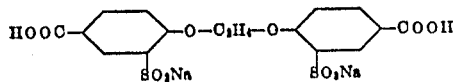

Fibers prepared from the polyamide soften at a temperature within the range of 255° C. to 268° C., and have a moisture regain of 8.8%.

*Example VII*

By substantially the same method as that described in Example IV a polyamide is made from 1.0 mole of 2-methyl-1,3-propanediamine, 0.25 mole of 2,7-dicarboxylnaphthalene-4-sulfonic acid sodium salt and 0.75 mole of trans-1,4-cyclohexanedicarboxylic acid. Fibers made from the polymer have a moisture regain of 9.2%.

*Example VIII*

By substantially the same method as that described in Example IV a polyamide is made from 1.0 mole of 1,4-cyclohexanebis(methylamine), 0.20 mole of 5-sulfoisophthalic acid potassium salt and 0.80 mole of dimethylmalonic acid. The fibers prepared therefrom have a moisture regain of 7.6%.

*Example IX*

By substantially the same method as that described in Example IV a polyamide is made from 1.0 mole of 3-methylhexamethylenediamine, 0.20 mole of 5-sulfoisophthalic acid lithium salt and 0.80 mole of oxalic acid. Fibers made from the polymer have a moisture regain of 8.8%.

In preparing the modified polyamides of this invention with aminoacids, the sulfonated aromatic dicarboxylic acid is preferably employed as a salt of a diamine. The salt is prepared by reacting substantially equimolar proportions of the diamine and the acid. The aminoacid and the salt are reacted in proportions so as to provide a polyamide comprised of (a) from about 40 to 60 mole percent of the recurring units

—HN—R—CO— wherein R is as previously defined and (b) from about 60 to 40 mole percent of a recurring unit selected from

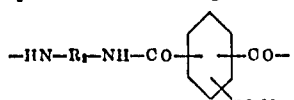

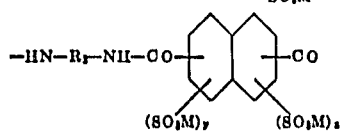

and

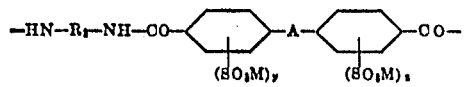

wherein $R_2$, M, A, y and z are as previously defined.

In preparing polyamides from salts of a diamine and a dicarboxylic acid, as above defined, and a sulfonated aromatic dicarboxylic acid, as above defined, the proportions of the reactants employed will be as follows: about 50 mole percent of the diamine, from about 5 to 35 mole percent of the sulfonated aromatic dicarboxylic acid, and from about 45 to 15 mole percent of the dicarboxylic acid, the sulfonated aromatic dicarboxylic acid and the dicarboxylic acid being first and separately combined with equivalent mole proportions of the diamine to form the respective salts thereof. Thus, for example, a salt is prepared from 15 mole percent of the diamine and 15 mole percent of the sulfonated aromatic dicarboxylic acid, and a salt is prepared from 35 mole percent of the diamine and 35 mole percent of the carboxylic acid. The thus prepared salts are subsequently employed in the preparation of the novel polyamides of this invention. While the above proportions give satisfactory results the preferred proportions are as follows: about 50 mole percent of the diamine, from about 15 to 25 mole percent of the sulfonated aromatic dicarboxylic acid, and from about 35 to 25 mole percent of the dicarboxylic acid.

It is to be understood that the above description and examples are illustrative of this invention and not in limitation thereof.

I claim:
1. A polyamide comprised of
 (A) recurring structural units having the structure

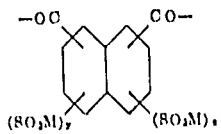

or

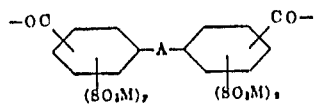

wherein M is an alkali metal; $y$ and $z$ are 0 or 1, the sum of $y$ and $z$ being at least 1; and A represents a direct bond, —O—, —CH$_2$—, —O—CH$_2$—CH$_2$—O— or

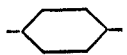

and
 (B) recurring structural units having the structure
 —HR—R$_2$—NH—
 wherein R$_2$ is selected from the group consisting of divalent aliphatic radicals, divalent alicyclic radicals, and divalent aromatic radicals.

2. A polyamide comprising as recurring units:
 (A) 0.25 mole proportion of:

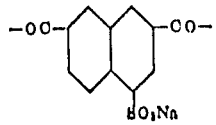

and
 (B) 0.75 mole proportion of the trans isomer of:

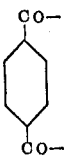

and
 (C) 1.0 mole proportion of:

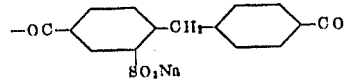

3. A polyamide comprising as recurring units:
 (A) 0.20 mole proportion of:

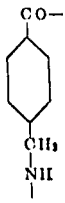

(B) 0.80 mole proportion of:

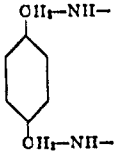

and
 (C) 0.20 mole proportion of:
 —NH—CH$_2$—CH$_2$—CH$_2$—CH—NH—

4. A polyamide comprising as recurring units:
 (A) 0.20 mole proportion of:

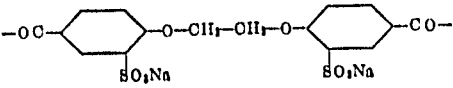

(B) 0.80 mole proportion of:
 —OC—CH$_2$—CH$_2$—CH$_2$—CH$_2$—CH$_2$—CO—
and
 (C) 1.0 mole proportion of:

—CH$_2$—NH—
[cyclohexane ring]
—CH$_2$—NH—

5. A fiber of the polyamide as defined in claim 1.
6. A film of the polyamide as defined in claim 1.

References Cited by the Examiner
UNITED STATES PATENTS

| | | | |
|---|---|---|---|
| 3,018,272 | 1/1962 | Griffing et al. | 260—49 X |
| 3,049,512 | 8/1962 | Fournet et al. | 260—49 |
| 3,053,806 | 9/1962 | La Combe et al. | 260—49 |
| 3,142,662 | 7/1964 | Huffman | 260—78 |
| 3,184,436 | 5/1965 | Magat | 260—78 |

WILLIAM H. SHORT, *Primary Examiner.*

J. C. MARTIN, *Assistant Examiner.*

BEST AVAILABLE COPY

UNITED STATES PATENT OFFICE
CERTIFICATE OF CORRECTION

Patent No. 3,296,204 January 3, 1967

John R. Caldwell

It is hereby certified that error appears in the above numbered patent requiring correction and that the said Letters Patent should read as corrected below.

Column 7, line 66, after "270° C." insert -- in --; column 9, line 52, for "-HR-$R_2$-NH-" read ---NH-$R_2$-NH- --.

Signed and sealed this 30th day of April 1968.

(SEAL)
Attest:

Edward M. Fletcher, Jr.
Attesting Officer

EDWARD J. BRENNER
Commissioner of Patents